Patented Aug. 7, 1923.

1,464,292

UNITED STATES PATENT OFFICE.

SAMUEL PEACOCK, OF WHEELING, WEST VIRGINIA, ASSIGNOR TO WILLIS G. WALDO, OF WASHINGTON, DISTRICT OF COLUMBIA.

PROCESS OF PRODUCING BORON NITRIDE.

No Drawing.    Application filed December 8, 1921.    Serial No. 520,994.

*To all whom it may concern:*

Be it known that I, SAMUEL PEACOCK, a citizen of the United States, residing at Wheeling, in the county of Ohio and State of West Virginia, have invented certain new and useful Improvements in Processes of Producing Boron Nitride; and I do hereby declare the following to be a full, clear, and exact description of the invention, such as will enable others skilled in the art to which it appertains to make and use the same.

This invention relates to a process of producing boron nitride, and has for its object to provide a procedure which will be more efficient and less costly than those heretofore proposed.

With these and other objects in view, the invention consists in the novel steps and combinations of steps more fully hereinafter disclosed and particularly pointed out in the claims.

In carrying out this invention, I take boron oxide, $B_2O_3$ in a finely divided form, charge the same in a retort, connected with a valved supply of free nitrogen whereupon before the nitrogen is turned on, the temperature of the oxide is raised to the reacting point, or to, say, about 300° C., whereupon the nitrogen is turned on and the sodium is introduced in small quantities, when the following reaction will occur:

$$B_2O_3 + 6Na + N_2 = B_2N_2 + 3Na_2O.$$

In order to facilitate the procedure, the nitrogen is maintained in the closed furnace chamber at a constant pressure somewhat above one atmosphere, and the reaction being strongly exothermic as soon as it starts, the source of heat is turned off. By means of a suitable pyrometer, the temperature of the reaction chamber is kept under observation, and is controlled by the speed with which the sodium is fed into the furnace. This temperature is preferably kept below 800° C., 900° C., or 1000° C.

After substantially all the boron oxide $B_2O_3$ has been converted into the nitride the temperature of the furnace will fail to rise upon the addition of more sodium and when this failure is observed, the nitrogen supply is cut off and the furnace chamber raised to a temperature of between, say, 1000 C. and 1200° C. or about 1100° C. to distill off and separate out the sodium oxide, $Na_2O$ formed. This oxide is suitably recovered as by collecting the same in condensers, and the boron nitride $B_2N_2$ formed is now removed from the furnace.

It is important that in subliming off the sodium oxide, the temperature be not raised to a point which will dissociate or otherwise cause a loss in the boron nitride left in the furnace.

If it is not desired to recover the sodium oxide as such, the retort charge containing the said oxide and the boron nitride may be treated with boiling water whereupon sodium borate and ammonia is produced, in accordance with the following equation:

$$2B_2N_2 + 3Na_2O + 6H_2O = 4NH_3 + Na_6B_4O_9.$$

But it is preferred for industrial purposes to first separate out the sodium oxide and then the boron nitride, in the manner just stated.

It is obvious that those skilled in the art may vary the details of the procedure without departing from the spirit of the invention, and therefore I do not wish to be limited to the above disclosure except as may be required by the claims.

What is claimed is:

1. The process of producing boron nitride which consists in heating boron oxide in an atmosphere of nitrogen to a temperature at which it will react with elemental sodium; and adding sodium to the hot oxide to form the desired nitride, substantially as described.

2. The process of producing boron nitride which consists in heating finely divided boron oxide in an atmosphere of free nitrogen to a temperature at which a reaction with sodium will occur; adding sodium to the hot oxide to form the desired nitride; and cutting off the supply of external heat, substantially as described.

3. The process of producing boron nitride which consists in heating boron oxide in a closed chamber in an atmosphere of free nitrogen to a temperature at which a reaction with elemental sodium will occur; adding to the heated oxide a quantity of elemental sodium insufficient to raise the contents of the chamber above 1000° C.; cutting off the supply of external heat; and adding an additional quantity of sodium to said chamber, substantially as described.

4. The process of making boron nitride which consists in heating boron oxide in an atmosphere of free nitrogen to a temperature at which it will react with elemental sodium; adding said sodium to said oxide to form the desired nitride; and recovering the latter; substantially as described.

In testimony whereof I affix my signature.

SAMUEL PEACOCK.